Figure 1:
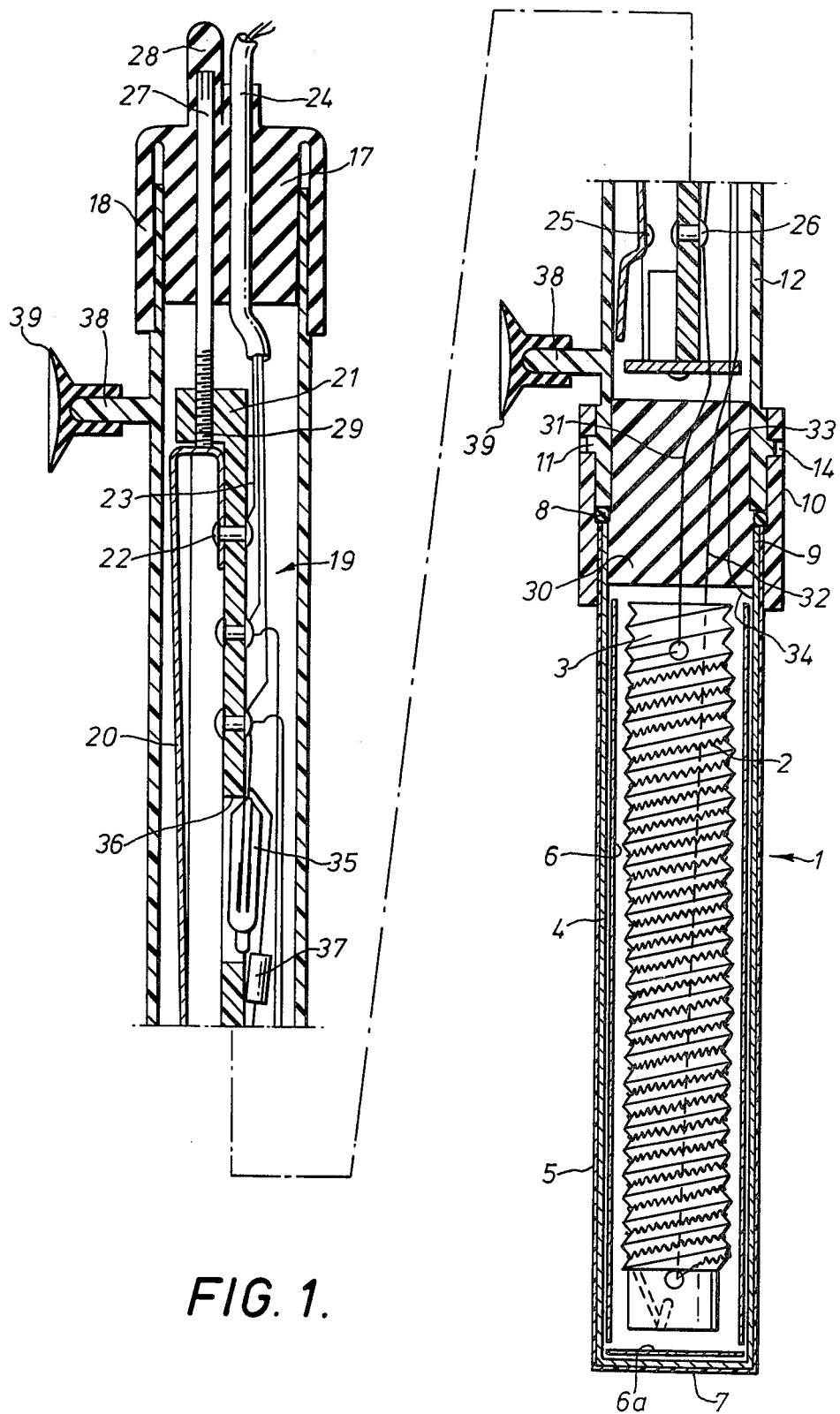

United States Patent [19]

Ellson

[11] 4,107,514
[45] Aug. 15, 1978

[54] SUBMERSIBLE THERMOSTATICALLY CONTROLLED HEATERS

[75] Inventor: Walter Gill Ellson, Nantwich, England

[73] Assignee: C. Ellson & Co. Ltd., Nantwich, England

[21] Appl. No.: 763,103

[22] Filed: Jan. 27, 1977

[30] Foreign Application Priority Data

Mar. 26, 1976 [GB] United Kingdom ............... 12350/76

[51] Int. Cl.² .............................................. H05B 3/06
[52] U.S. Cl. .................................... 219/523; 174/51; 219/331; 219/544; 362/397
[58] Field of Search ............... 219/331, 523, 535, 544, 219/552; 174/51; 248/206 R, 363; 240/52.2

[56] References Cited

U.S. PATENT DOCUMENTS

| 2,002,380 | 5/1935  | Wernicke et al. ........... 240/52.2 UX |
| 2,629,041 | 2/1953  | Fein et al. ......................... 219/523 X |
| 2,806,314 | 9/1957  | Moran .............................. 240/52.2 X |
| 2,930,634 | 3/1960  | Merritt ............................. 219/535 X |
| 3,062,940 | 11/1962 | Bauer et al. ........................... 219/544 |
| 3,329,803 | 7/1967  | Sink ................................. 219/523 X |
| 3,371,192 | 2/1968  | Rosenel ................................. 219/523 |
| 3,441,711 | 4/1969  | Hirschowitz .................... 219/523 X |
| 3,617,611 | 11/1971 | Kuether ................................ 174/51 |
| 3,895,217 | 7/1975  | Hall et al. ............................ 219/523 |
| 3,922,528 | 11/1975 | Nickmeyer et al. ................. 219/523 |

FOREIGN PATENT DOCUMENTS

| 894,932   | 10/1953 | Fed. Rep. of Germany ........... 219/523 |
| 595,969   | 12/1947 | United Kingdom ..................... 219/523 |
| 1,373,093 | 11/1974 | United Kingdom ..................... 219/523 |

Primary Examiner—Volodymyr Y. Mayewsky
Attorney, Agent, or Firm—Schuyler, Birch, Swindler, McKie & Beckett

[57] ABSTRACT

Instead of the usual glass case the heating element and thermostat of a submersible thermostatically controlled heater are disposed in separate cases made of metal and plastics respectively which are secured together in liquid-tight manner with the heating element connected through the thermostat to an external source of operating current and the metal case for the heating element connected to earth.

11 Claims, 3 Drawing Figures

SUBMERSIBLE THERMOSTATICALLY CONTROLLED HEATERS

This invention relates to submersible thermostatically controlled heaters and is particularly, though not exclusively, concerned with such heaters for use in aquaria and in the home brewing of alcoholic beverages.

It has been common practice with such heaters to house the heating element and a thermostat through which it is connected to a source of operating current, in the same casing which takes the form of a glass tube, one end of which is permanently sealed and the other end of which is closed in liquid-tight manner by a removable plug through which the supply leads pass.

The use of glass has been favoured in the past because tubes of any convenient length and diameter can be manufactured therefrom easily and inexpensively.

With the advent of new safety regulations however, the use of glass alone for the casing is not enough and the problem has been either to line the conventional glass casing with a suitable insulating material or to replace it with a casing of a material which will satisfy the current regulations.

One obvious replacement for the glass tube is a metal tube which can be suitably earthed. The length of tube required to house both the heating element and the thermostat however, makes this solution uneconomic while the use of a synthetic plastics material would not be feasible in view of the inability of many plastics materials to withstand the amount of heat emitted by the heating element.

It has now been found that if the heating element and thermostat are housed in separate cases which are detachably connected together it is possible to employ an earthed metal housing for the heating element and a housing of synthetic plastics material for the thermostat without incurring the expense of an all-metal casing or facing the problem involved in the exposure of heat of synthetic plastics materials.

Accordingly, the present invention provides a submersible, thermostatically controlled heater comprising a heating element housed in a metal casing, a thermostat housed in a casing of synthetic plastics material and means for securing said casings together in liquid-tight manner with the heating element connected through the thermostat to an external source of operating current and the metal casing for the heating element connected to earth.

Figure 2:
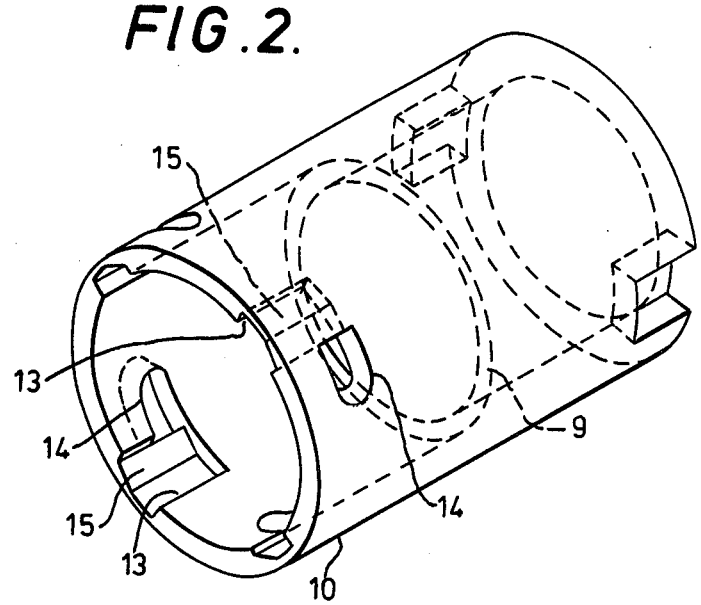
Figure 3:
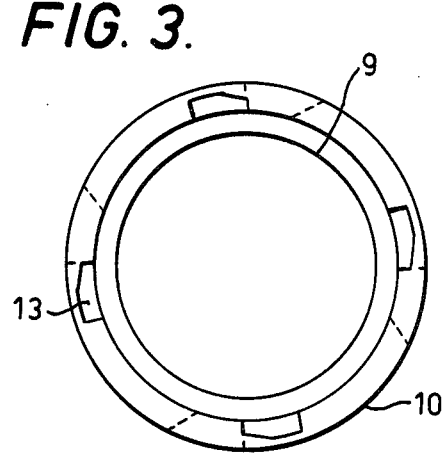

A preferred form of the invention will be described, by way of example, with reference to the accompanying drawings in which:

FIG. 1 is a section through a thermostatically-controlled heater for immersion in a fish tank; and FIGS. 2 and 3 are perspective and end views respectively, on a larger scale, of the locking sleeve shown in FIG. 1.

Referring to FIG. 1, heater 1 in the form of a coiled nickel chrome wire heating element 2 wound upon a ceramic former 3 is housed in a metal tube 4 preferably provided with an external coating 5 of synthetic plastics material e.g. nylon or other suitable non-toxic material, and is insulated from the tube by a sleeve 6 and end disc 6a of mica or other insulating material. The metal tube 4 is permanently closed at one end 7 and open at the other, the open end being provided with an external annular bead 8 for engagement by an internal annular shoulder 9 on locking sleeve 10 of polycarbonate or other suitable synthetic plastics material, one end of which is formed with bayonet slots to receive external pins 11 provided adjacent the open end of a transparent tube 12 moulded from polycarbonate or other strong durable synthetic plastics material when the tubes 4 and 12 are to be secured together.

As shown in FIGS. 2 and 3, each bayonet slot in the sleeve 10 comprises a first part 13 extending axially of the sleeve and a second part 14 extending circumferentially of the sleeve. The part 14 extends right through the wall of the sleeve whereas the part 13 is formed on the inside surface of the sleeve and is closed off from the outside surface by a thin wall portion 15 which yields outwardly to permit a pin 11 to pass through the part 13 into the part 14 and thereafter snaps back into position to lock the pin in the part 14 of the slot and thus prevent accidental separation of the tubes 4 and 12.

The transparent tube 12, which is closed at its other end by a resilient bung 17 of conventional form having a skirt portion 18 which fits tightly over the end of the tube, contains a thermostat 19 comprising a bimetallic strip 20 secured, adjacent one end, to a terminal block 21 of insulating material by a rivet 22 through which it is connected to the live lead 23 of a supply cable 24 passing in liquid-tight manner through the bung 17 for connection to an external source of operating current. The bimetallic strip 20 is provided, adjacent its free end, with a contact 25 movable with the strip towards and away from a fixed contact 26 on the terminal block 21, in response to temperature changes and to manual adjustment of a set-screw 27, passing through the bung 17 into a twistable and squeezable projection 28 thereof and bearing upon a bent-over portion 29 of the strip. Before securing the two tubes 4 and 12 together a bung 30 of rubber, cork or synthetic plastics material, the ends of which fit tightly in the adjacent open ends of the tubes, is inserted between the tubes and is bored for the passage of a supply lead 31 from the fixed contact 26 on the terminal block 21 to one end of said heating element 2, a return lead 32 from the other end of said heating element to the terminal block for connection to the supply cable 24 and an earthed lead 33 from the supply cable to a point 34 on the wall of the metal tube 4. The temperature at which the contacts 25, 26 open to break the circuit through the heating element 2 and a small neon lamp 35 disposed in an aperture 36 in the terminal block 21 and connected to the fixed contact 26 through an attenuating resistance 37, is controlled by the manually adjustable set-screw 27. The lamp 36 which is visible through the wall of the tube 12 indicates that the heater 1 is operating.

The tube 12 is preferably formed with external projections 38 on which are fitted suction pads 39 by means of which the device can be secured to the wall of a fish tank or other vessel.

Instead of employing a plastics tube 12 which is adapted to be secured in axial alignment with the metal tube 4, the former may be replaced by a plastics box or case (not shown) which extends transversely of the metal tube and is connected at its centre to the end of the tube.

By housing the thermostat 19 in a separate case or tube it is possible to employ a thin plastics case or tube through which the neon lamp 35 can be seen and through which heat changes in the surrounding water can be readily detected by the thermostat but which is nevertheless strong and durable and not subject to damage by heat.

By housing the heater 1 in separate earthed metal tube 4 which can be economically coated with a non-toxic plastics material providing additional insulation, heat transference to the surrounding water is rapid and the chances of breakage are small.

When the two separate parts are secured together the insulating properties of the interposed bung 30 prevent the heater 1 from influencing the operation of the thermostat 19 which is solely responsive to the temperature of the surrounding water.

If required, the connecting bung 30 may be omitted and the two tubes 4 and 12, when suitably sealed, sold separately and employed independently of each other.

I claim:

1. A submersible thermostatically-controlled heater, comprising a metal tube which is permanently closed in liquid-tight manner at one end and contains an electrical heating element mounted on a ceramic former and separated from the side and end walls of the tube by a wall of electrically insulating material, a tube of synthetic plastics material closed in liquid-tight manner at one end by a bung of resilient electrically insulating material and containing a thermostat mounted on a terminal block of electrically insulating material, means securing the other ends of said tubes together in liquid-tight manner and an electrical circuit for connecting said heating element to an external source of operating current through said termostat and for connecting said metal tube to earth, including electrical supply leads which pass in liquid-tight manner through apertures in said bung.

2. A heater according to claim 1, wherein said metal tube is provided with an external coating of non-toxic synthetic plastics material.

3. A heater according to claim 1, wherein said casing containing the thermostat is made of transparent material.

4. A heater according to claim 3, wherein said material is polycarbonate.

5. A heater according to claim 1, wherein said casings are tubes connected end to end by a bung which enters and seals the adjacent open ends of the tubes and is apertured for the passage of electrical leads from the heating element to the thermostat.

6. A heater according to claim 5, wherein said tubes are secured together by an external sleeve of synthetic plastics material which is a close fit on both tubes.

7. A heater according to claim 6, wherein said sleeve has an internal annular shoulder which engages an external annular bead on the open end of said metal tube and bayonet type slots for receiving pins on the outer surface of said plastics tube.

8. A heater according to claim 7, wherein said sleeve is formed with means for locking said pins in said slots.

9. A heater according to claim 1, wherein an earthed lead from an external source of supply is connected to a point on the wall of said metal tube.

10. A heater according to claim 1, wherein, said plastics tube is formed with means for enabling the heater to be detachably secured to the wall of a fish tank of other liquid-containing vessel.

11. A heater according to claim 10, wherein said means comprise external projections moulded integral with said casing and adapted to house suction pads fitted thereon.

* * * * *